Jan. 18, 1927.
J. Y. CASE
BRAKE LINING
Filed April 5, 1926
1,615,165
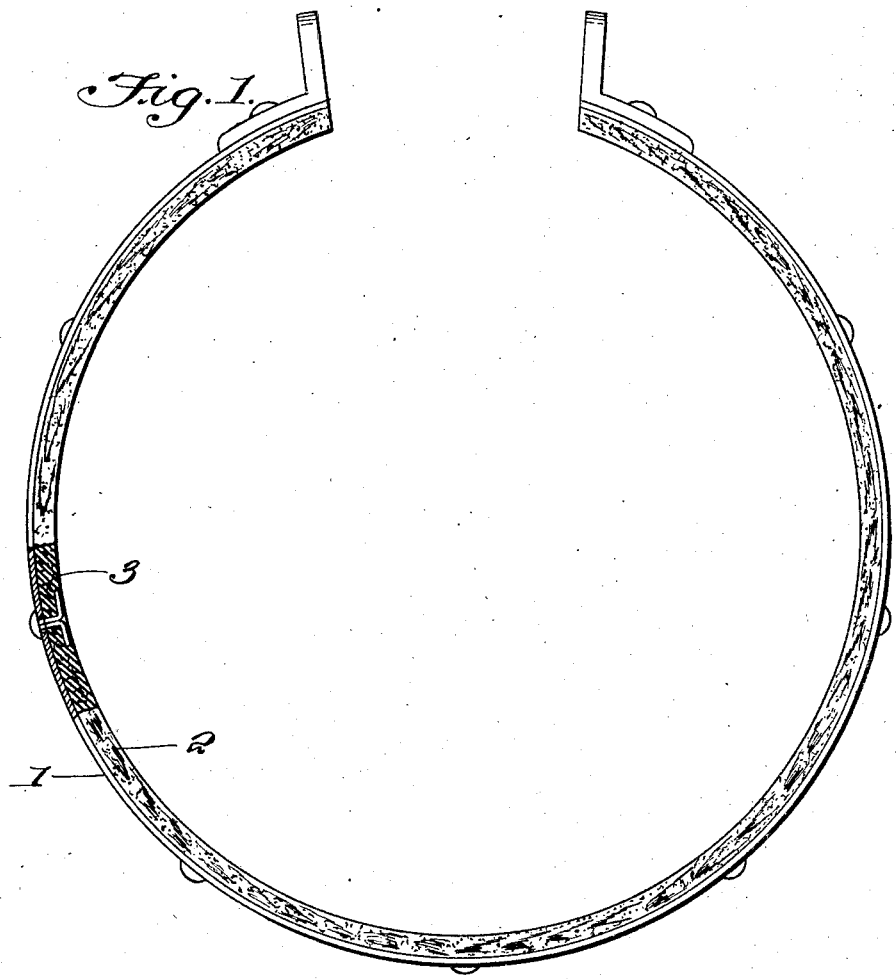
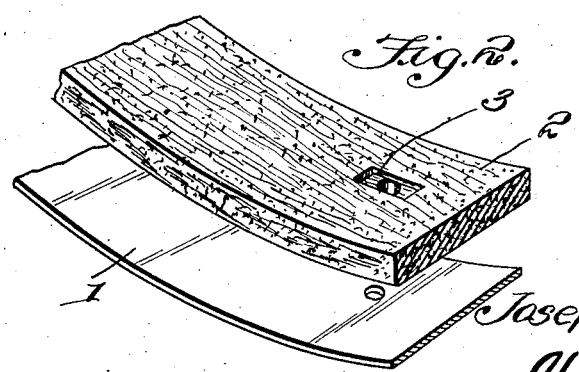
Joseph Y. Case
INVENTOR
BY Victor J. Evans
ATTORNEY
WITNESS Patented Jan. 18, 1927.

1,615,165

UNITED STATES PATENT OFFICE.

JOSEPH Y. CASE, OF ORTING, WASHINGTON.

BRAKE LINING.

Application filed April 5, 1926. Serial No. 99,903.

My present invention has reference to an improved brake lining for automobiles, tractors or the like.

The object is the provision of a brake lining for this purpose formed from a strip of wood, treated in a manner to permit of the bending thereof so that the same can be effectively secured on the brake band, as well as to preserve the life thereof, rendering the same moisture proof and giving the same quick gripping and stopping qualities, and likewise preventing the squeaking of the brake when applied.

To the attainment of the foregoing, reference is to be had to the drawings which accompany and form part of this application.

In the drawings:

Figure 1 is an edge view of the improvement in applied position.

Figure 2 is a fragmentary perspective view showing the brake lining raised above the brake band.

Referring now to the drawings in detail, the numeral 1 designates a metal brake band and 2 the lining therefor which is in accordance with this invention. The lining, at the portion thereof through which the rivets pass, has its outer face formed with longitudinal depressions 3 so that the split ends of the rivets may be wholly received in the depressions.

The brake band 2 is of wood, the fibres of which run longitudinally thereof. The wooden brake band is subjected to an eight hour treatment in a boiling neutral oil, creosote and rosin. By neutral oil I mean an oil from which free and fatty acids have been sufficiently removed. The neutral oil gives the band lubricating qualities which keeps it from squeaking, the creosote preserves the wood and prevents it from absorbing moisture, while the rosin gives the lining quick gripping qualities so that a positive frictional engagement of the band with the brake wheel is thus insured. The formula used is one gallon neutral oil, one-fourth gallon creosote and one-eighth gallon of rosin, while to color the brake band I dissolve one pound black dry color and one pint linseed oil and apply the same on the brake band. My improved lining may be cheaply manufactured and marketed at a reasonable cost and will afford greater braking qualities than any other brake lining with which I am acquainted.

Having described the invention, I claim:

1. The herein described method of producing brake linings, comprising a strip of wood, subjected to treatment in boiling neutral oil, creosote and rosin.

2. The herein described method of producing brake linings from wooden strips in which the strips are subjected to an eight hour treatment in neutral oil, creosote and rosin and the mixture brought to a boiling point and the proportions thereof are one gallon of neutral oil, one-fourth gallon of creosote and one-eighth gallon of rosin.

In testimony whereof I affix my signature.

JOSEPH Y. CASE.